Patented Aug. 19, 1930

1,773,293

UNITED STATES PATENT OFFICE

RAYMOND C. BENNER, OF BAYSIDE, AND ALFRED PAUL THOMPSON, OF JACKSON HEIGHTS, NEW YORK, ASSIGNORS TO GENERAL CHEMICAL COMPANY, OF NEW YORK, N. Y., A CORPORATION OF NEW YORK

PROCESS FOR OBTAINING ELEMENTAL SULPHUR AND CATALYSTS THEREFOR

No Drawing.   Application filed June 30, 1926.  Serial No. 119,739.

This invention relates to a process for obtaining elemental sulphur by the interaction of sulphur dioxide and hydrogen sulfide, or by the oxidation of hydrogen sulfide with air or oxygen, in the presence of a catalyst, and to the catalyst therefor.

It has been known heretofore that hydrogen sulfide and sulphur dioxide when present in gas mixtures in considerable amounts or in the pure state may be made to react more or less completely in the presence of suitable solid catalytic agents, when such catalytic agents are maintained in a heated condition, usually 300° C. or above.

It is an object of our invention to provide a process whereby the reaction between hydrogen sulfide and sulphur dioxide in a gas mixture containing small amounts of these substances may be made to take place at temperatures below 200° C. and at a rate which renders the process commercially practicable. It is a further object of our invention to provide a process whereby small amounts of hydrogen sulfide in gas mixtures may be oxidized to elemental sulphur by air or oxygen at comparatively low temperatures.

While it has been known that bauxite, a natural mineral having a chemical composition of hydrated alumina and iron oxide, exhibits a marked catalytic effect on the oxidation of hydrogen sulfide by air or oxygen, it has been found necessary to maintain the catalyst in a heated state so that the rate of oxidation of the hydrogen sulfide to elemental sulphur might be commercially practicable and the reaction might be fairly complete.

We have discovered that, by proper activation of this natural mineral bauxite, we are able to increase its catalytic activity to such an extent that hydrogen sulfide and sulphur dioxide, at ordinary temperatures, may be made to react in its presence at commercially practicable rates. For example, with a gas mixture containing 1.2% total sulphur compounds in the form of hydrogen sulfide and sulphur dioxide we are able to obtain complete reaction of the gases according to the equation

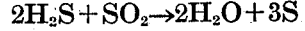

$$2H_2S + SO_2 \rightarrow 2H_2O + 3S$$

for a period of four hours when the gas, at a temperature of about 27° C., is passed through a layer of activated Dalmatian bauxite at a speed of 320 cu. ft. per hr. per cu. ft. of catalyst space. Since the reaction is somewhat exothermic there will be a rise in temperature of 20–30° C. in the layer of catalyst, so that the temperature in the zone of reaction may be approximately 50–60° C. Likewise we have found that if a gas mixture containing 2.6% hydrogen sulfide and 97.4% air, at a temperature of about 30° C., is passed at the rate of 130 cu. ft. per hr. per cu. ft. of catalyst space through activated Dalmatian bauxite that complete oxidation of the hydrogen sulfide to sulphur and water is obtained according to the equation

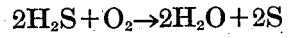

$$2H_2S + O_2 \rightarrow 2H_2O + 2S$$

for a period of eight hours.

While bauxites of varying analyses may be employed in the preparation of our novel catalyst, we have found that bauxites which have a comparatively high loss on ignition are preferable. We have found that Dalmatian, British Guiana, and French bauxites are particularly active and retain their catalytic activity for long periods. A typical analysis of Dalmation bauxite is as follows:

| | Per cent |
|---|---|
| Alumina ($Al_2O_3$) | 52.98 |
| Ferric oxide ($Fe_2O_3$) | 21.01 |
| Silicon dioxide ($SiO_2$) | 2.03 |
| Titanium oxide ($TiO_2$) | 3.03 |
| Loss on ignition | 20.25 |

The process of preparation of the novel catalyst consists in activating natural bauxite by treating it at a temperature sufficiently high and for a sufficiently long period to cause substantially complete dehydration. Such dehydration may be accomplished by slowly heating the natural bauxite to a temperature of 400° C. or above and maintaining such temperature for several hours, the exact temperature and period required being dependent, however, on the type of bauxite. It is undesirable to heat treat the bauxite at a temperature greatly in excess of that required for substantially complete dehydration, since in doing so the beneficial results are thereby somewhat decreased. The resulting activated product is found to possess very considerably greater catalytic activity than the natural mineral.

More specifically, we have found that this novel product will completely catalyze the reaction between hydrogen sulfide and sulphur dioxide when the gases are introduced at ordinary temperatures whereas when using the natural bauxite as heretofore known practically no reaction occurs under the same conditions and it is necessary to maintain a temperature of about 300° C. for complete reaction. We have also found that this activated bauxite will catalyze the oxidation of hydrogen sulfide with air or oxygen at low temperatures, whereas with the natural bauxite, temperatures in excess of 300° C. are required for commercial rates. In the treatment of gas mixtures containing sulphur dioxide and hydrogen sulfide it is desirable that the ratio of the active gaseous constituents should be according to reacting proportions, i. e. two volumes of hydrogen sulfide to one volume of sulphur dioxide, in order that there shall be neither active constituent in the residual gas. Where, therefore, the amount of either constituent of the gas mixture is variable, we prefer to regulate the ratio as indicated. This is, however, not necessary in carrying out the reaction by our improved process and it is to be noted that this activated bauxite functions not only as a catalyst but also as an active adsorbent for both hydrogen sulfide and sulphur dioxide. Consequently when one of the reacting gases is in slight excess it will be adsorbed by the catalyst, thereby preventing its escape.

The gaseous mixture containing hydrogen sulfide and sulphur dioxide to be treated is passed, at ordinary temperatures, in contact with, preferably through, a layer of activated bauxite. The sulphur produced by the reaction is practically all deposited in a solid state on the surface of the catalyst and may be subsequently removed at intervals. Whatever elemental sulphur is contained in the gases leaving the catalyst may be recovered by suitable scrubbers, etc. It is, however, found that considerable quantities of sulphur may be deposited without producing a deleterious effect on the catalyst or substantially decreasing its activity. Our process is of special value when treating gas mixtures containing quite small amounts of sulphur dioxide and hydrogen sulfide. Such gas mixtures may be passed at ordinary temperatures and at commercial speeds in contact with the activated bauxite with practically complete reaction between the sulphur dioxide and hydrogen sulfide. Since the gas mixture in this case contains but small amounts of the active constituents, only a small amount of sulphur will be deposited while treating comparatively large quantities of the gas mixture, and accordingly the catalyst may be used for a considerable time without cleansing from the deposited sulphur.

While very satisfactory results are obtained at the low temperatures employed, an even higher rate and more complete reaction may be realized if the temperature be maintained somewhat higher, for example 150° C. In fact, operation at this higher temperature is preferred when the reacting gases are already thus heated and no external heating is required. However, in all cases the temperature is not permitted to exceed that at which sulphur has an appreciable vapor pressure, i. e. about 200° C.

Thus it is apparent that when employing our novel catalyst and process very desirable and economical results may be obtained in the purification of gases from small amounts of hydrogen sulfide and sulphur dioxide and in the recovery of elemental sulphur.

We have further discovered that small quantities of ammonia vapor in the mixture of reacting gases materially hastens the reaction and permits even greater gas speeds than are possible when using our novel solid catalyst alone, the ammonia vapor functioning as a gaseous catalyst for the reaction. Accordingly we have found it desirable, although not necessary, to add small amounts of ammonia vapor to the mixture of reacting gases whenever such mixture does not contain such gaseous impurity.

We claim:

1. A method of obtaining elemental sulphur which comprises passing a gas mixture containing hydrogen sulfide and an oxidizing gas in contact with activated bauxite, at a temperature below 200° C.

2. A method of obtaining elemental sulphur which comprises passing a gas mixture containing hydrogen sulfide, an oxidizing gas and ammonia vapor in contact with activated bauxite, at a temperature below 200° C.

3. A method of obtaining elemental sulphur which comprises passing a gas mixture containing hydrogen sulfide, sulphur dioxide and ammonia vapor in contact with activated bauxite, at a temperature below 200° C.

4. A method of obtaining elemental sulphur which comprises passing a gas mixture containing hydrogen sulfide and an oxidizing gas, at ordinary temperatures, in contact with activated bauxite.

5. A method of obtaining elemental sulphur which comprises passing a gas mixture, at ordinary temperatures, containing hydrogen sulfide and sulphur dioxide in contact with activated bauxite.

6. A method of obtaining elemental sulphur which comprises passing a gas mixture containing sulphur dioxide and hydrogen sulfide in contact with a catalyst prepared by substantially completely dehydrating natural bauxite, and maintaining the temperature below 200° C. during the reaction.

7. A method of obtaining elemental sulphur which comprises passing a gas mixture containing hydrogen sulfide and an oxidizing gas in contact with activated bauxite, at a temperature below 200° C.

In testimony whereof, we affix our signatures.

RAYMOND C. BENNER.
ALFRED PAUL THOMPSON.